United States Patent [19]

Osborn

[11] 3,963,405

[45] June 15, 1976

[54] HAY CUBING ASSEMBLY

[76] Inventor: Glen E. Osborn, Star Rte. Box 265, Moses Lake, Wash. 98837

[22] Filed: Sept. 26, 1974

[21] Appl. No.: 509,388

Related U.S. Application Data

[63] Continuation-in-part of Ser. No. 230,218, Feb. 29, 1973, Pat. No. 3,859,026.

[52] U.S. Cl. .................................. 425/331; 56/432; 100/DIG. 6; 425/412; 425/436 R; 425/DIG. 230

[51] Int. Cl.$^2$ .......................................... A01D 39/00

[58] Field of Search ........... 425/331, 412, 436, 416, 425/DIG. 230; 100/DIG. 6, 156; 56/432

[56] References Cited

UNITED STATES PATENTS

| | | | |
|---|---|---|---|
| 2,144,054 | 1/1939 | Hall | 425/DIG. 230 |
| 3,101,510 | 8/1963 | Packham | 425/DIG. 230 |
| 3,166,026 | 1/1965 | Crane | 425/331 |
| 3,183,857 | 5/1965 | Lawrence | 425/DIG. 230 |
| 3,232,245 | 2/1966 | Lawrence et al. | 425/DIG. 230 |
| 3,234,894 | 2/1966 | Dechert | 425/331 |

*Primary Examiner*—Francis S. Husar
*Assistant Examiner*—Carl Rowold

[57] ABSTRACT

The hay cubing apparatus comprises a chassis having a substantially horizontally oriented table, the table having sidewalls issuing upwardly and at least a pair of dies mounted adjacent to the table on shafts, a feed cone carries on each of the dies. Each of the dies includes a rim being fastened to the shafts, a plurality of teeth mounted distally and radially about the rim, the dies meshing with each other, and means driving at least one of the shafts. Each feed cone material, handling means comprises an upstanding cone-shaped body, the body being mounted on the uppermost side of the dies; and an auger being a band projecting from the exterior walls of the cone-shaped body, and projecting in a spiral pattern from the apex to the base of the cone-shaped body.

4 Claims, 6 Drawing Figures

HAY CUBING ASSEMBLY

REFERENCE TO OTHER APPLICATIONS

This is a continuation-in-part of my application, Ser. No. 230,218, filed Feb. 29, 1973, now U.S. Pat. No. 3,859,026.

FIELD OF THE INVENTION

The present invention relates to hay cubers, and more particularly to hay cubers operable to continuously feed and cube hay material, and material handling means therefor.

BACKGROUND OF THE INVENTION

The present invention relates to material handling means operable to feed hay to gear-like hay cubing dies. Such hay cubing dies are operable to compress hay into cubes by continuous rotation and interdigitation of teeth in a bottomless gear. Alternative means to be drawn from the prior art include cylindrical auger flights, blowers and the like. As described in my earlier disclosure, these material handling means are operable to direct material to the point at which the dies mesh.

Accordingly, it is an object of the present invention to provide material handling means which operate as a portion unitary with hay cubing dies to feed material about the circumference of the dies. As shall be described hereinafter, such a material handling means could feed more than one pair of dies so that a maximal amount of the total circumferential die cubing surface could be in the meshing engagement necessary to make cubes. That is, a material handling means which could feed hay material about the circumference of the die could be used, with the proper arrangement of additional dies, to maximize the amount of surface actually involved in hay cubing. Such an arrangement could be further adapted to a highly compact and mechanically efficient hay cubing apparatus.

These and other objects shall become apparent from the description following, it being understood that modifications may be made without affecting the teachings of the invention here set out.

SUMMARY OF THE INVENTION

The hay cubing apparatus comprises a chassis having a substantially horizontally oriented table, the table having sidewalls issuing upwardly and at least a pair of dies mounted adjacent to the table on shafts, a feed cone carries on each of the dies. Each of the dies includes a rim being fastened to the shafts, a plurality of teeth mounted distally and radially about the rim, the dies meshing with each other, and means driving at least one of the shafts. Each feed cone material, handling means comprises an upstanding cone-shaped body, the body being mounted on the uppermost side of the dies; and an auger being a band projecting from the exterior walls of the cone-shaped body, and projecting in a spiral pattern from the apex to the base of the cone-shaped body.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
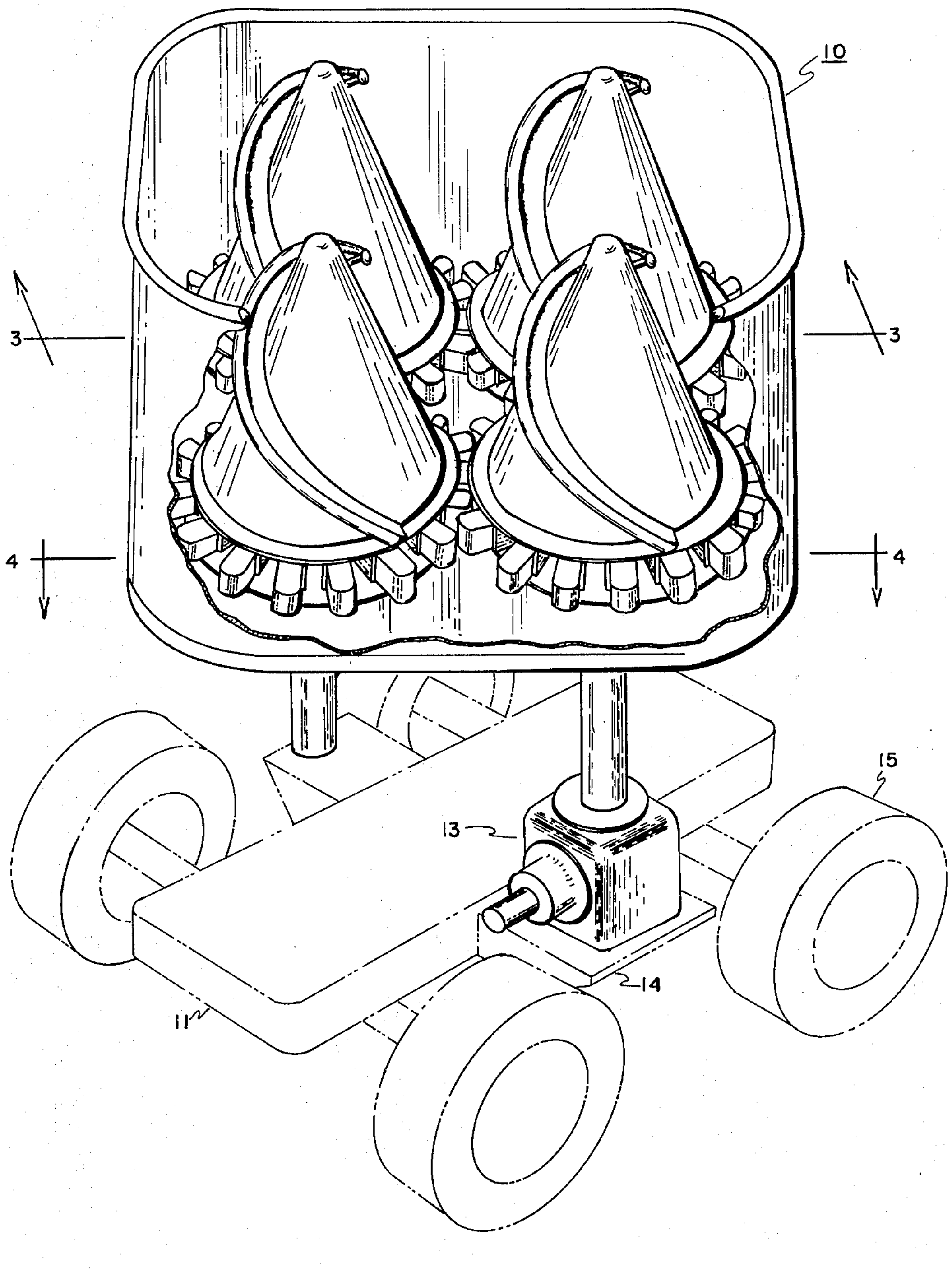
FIG. 1 is a perspective view of the hay cubing apparatus of this invention.
Figure 2:
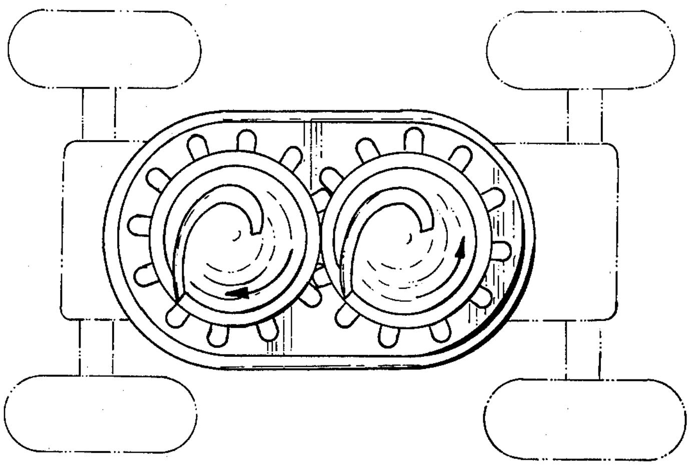
FIG. 2 is a top-plan of the present apparatus having a pair of cubing dies.

Referring now to the drawings, and more particularly to the FIGS. 1 and 2, the hay cubing apparatus of the present invention is shown to advantage and generally identified by the numeral 10. The hay cubing apparatus 10 comprises a chassis 11, a plurality of hay cubing dies 12, and drive means 13. The chassis 11 comprises a framework 14 having wheels 15. The framework 14 provides the essential support and mounting structure of the dies 12 and drive means 13.

Figure 3:
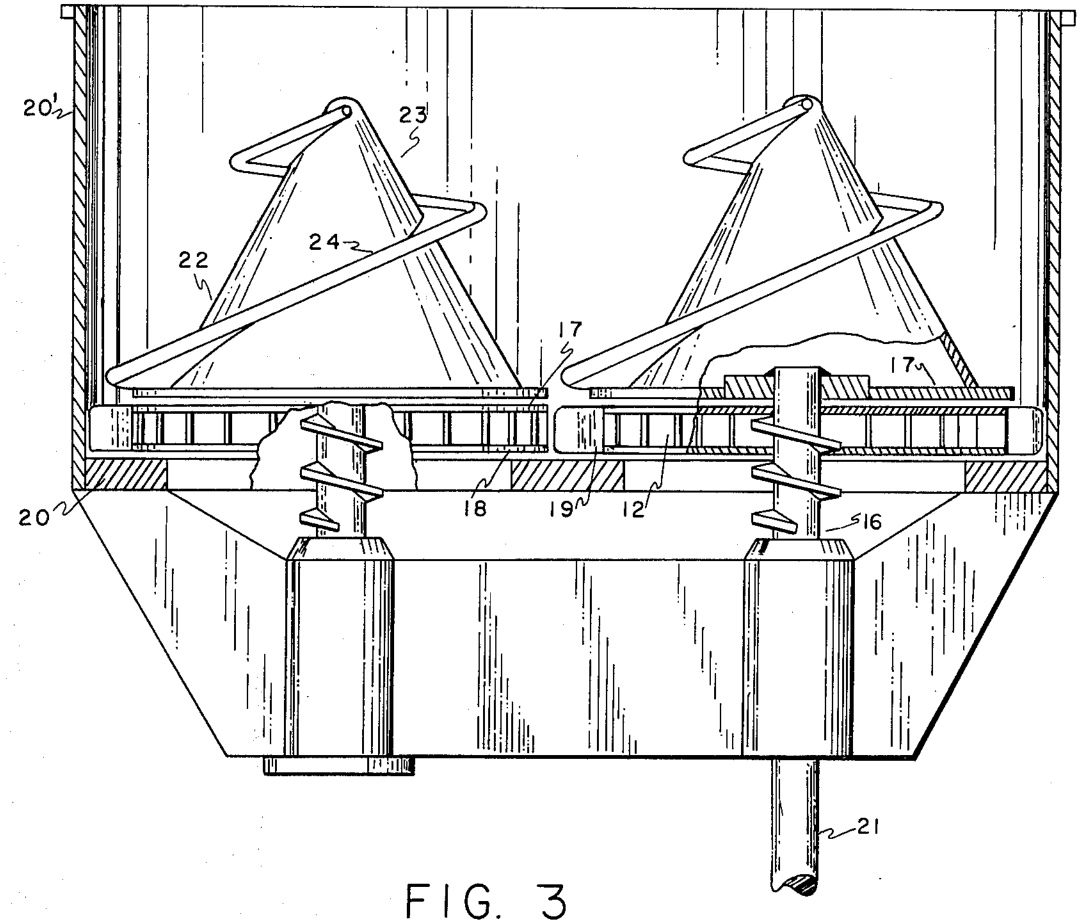
FIG. 3 is a fragmentary cross-sectional view taken along lines 3—3 of FIG. 1, of typical hay cubing dies with feed cones shown with means driving the hay cubing dies.
Figure 4:
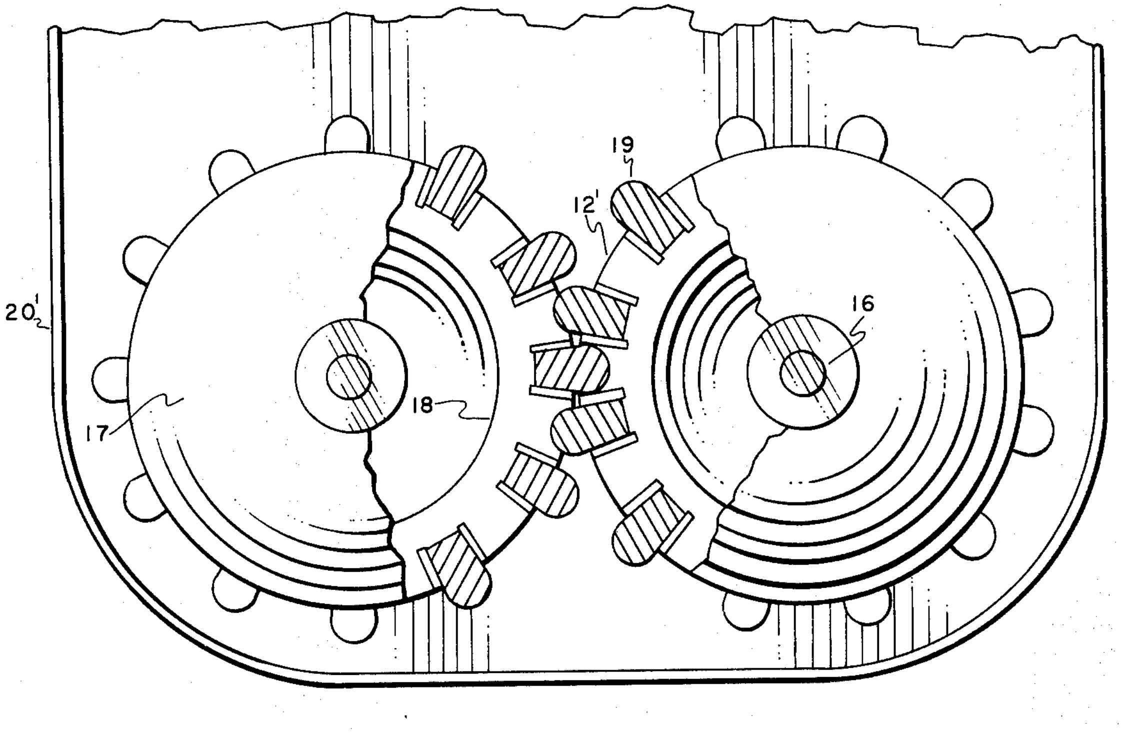
FIG. 4 is a cross-sectional view taken along lines 4—4 of the FIG. 1.

Referring now to the FIGS. 3 and 4, the dies 12 resemble interlocking spur gears disposed on parallelly mounted shafts 16. Each of the dies 12 comprises a rim 17, a support ring 18 and a multiplicity of teeth 19. Each rim 17 is suitably mounted to the shaft 16 and is operable to carry the support ring 18 and the teeth 19. The rim 17 forms the bottom sidewall of the die 12. A multiplicity of teeth 19 are mounted distally at intervals, radially about the circumference. The teeth 19 project outwardly above the terminal edge of the circumference of the rim 17 to form a row of gear teeth with a gear tooth void disposed between the adjacent teeth 26. Thus, the gear teeth 19 form bottomless dies having no closure between the teeth 19. A ring 18 is fastened to the teeth 19 parallel to the outer circumference of the rim 17.

Figure 5:
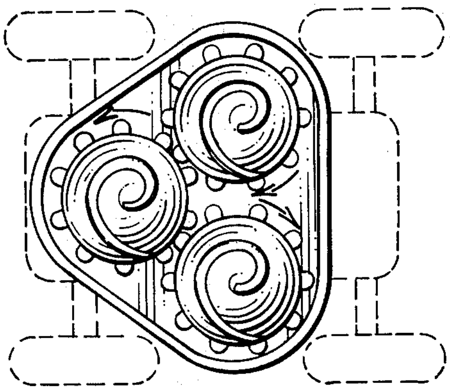
FIG. 5 is a plan view of a three-die embodiment of this invention.
Figure 6:
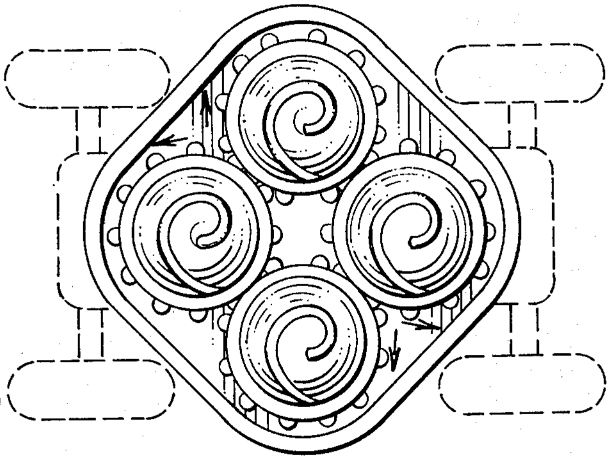
FIG. 6 is a plan view of a four-die embodiment of this invention.

As shown in the FIG. 2, a plurality of dies 12 are journally mounted on a portion of the table 20 of the framework 14 in a substantially horizonal orientation. The journally mounted dies 12 mesh one with another at the teeth 19. The dies 12 are enclosed by upstanding sidewalls 20' which issue from the table 20. A preferred pattern and number of dies 12 include a four-die, rectangular pattern. As shown more clearly in the FIG. 3, the dies are driven by drive means such as a gear box 21 having an upstanding shaft 21' which may be connected to one of the dies 12 to drive all dies on the table 20. Other mechanical arrangements may be employed. It may be seen that other numbers and patterns of dies including a pair of dies, shown in FIG. 5, may be used herein, a three-die triangular pattern, shown in FIG. 6 and so on.

Each die 12 is provided with an upstanding feed cone 22. Each feed cone 22 comprises a cone-shaped body 23 and an auger slight 24. Each cone-shaped body 23 is mounted with its base contiguous with the rim 17 of each die 12. The auger flight 24 is a bank projecting from the exterior wall of the body 23 which spirals from the apex to the base of the cone 22. The auger 24 is operable to urge and meter hay downwardly to the teeth 19 of each die 12.

Referring now to the FIGS. 1 and 2, hay is cubed by the apparatus 10 by feeding hay between the dies 12. The dies 12 are set in rotation by meshing of the teeth 19 of one die 12 with the void interval of another die 12. Lose hay is compressed by this meshing of the teeth 19 into the void interval of the opposing die 12'. It is to be understood that the compressive force developed by such interdigitation results in a highly hay mass. The compressed hay material is forced between the intervals of the dies in an extrusion-like manner to form a plurality of hay cubes. Hay compressed toward the centers of the dies 12 is discharged through the central cavity (not shown) of the dies 12 and holes (not shown) in the table 20.

The cone configuration of the body 23 of each of the feed cones 22 directs all hay material, no matter how it is distributed when discharged into the enclosure formed by the sidewalls 20' to the teeth 19, to the dies 12. A multiplicity of simple and conventional hay pick-up means may be employed to supply the apparatus 10. Such pick-up means may include blowers, auger conduits, and the like. It is also to be understood that the feed cones of the present invention permit the dies 12 to be oriented on a horizontal plane, and for the degree of meshing of the dies 12 (and thus, the number of operating teeth 19 to be greatly increased). This further results in great mechanical efficiency, and exceptional production capacity.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A hay cubing apparatus, comprising:

a chassis, said chassis having a substantially horizontally oriented table; said table having sidewalls issuing upwardly; and at least a pair of dies mounted adjacent to said table on shafts, each of said dies including a rim, being fastened to said shafts, said dies including a plurality of teeth mounted distally and radially about said rim, said dies meshing with each other at their outer circumference, means driving at least one of said shafts; and a feed cone material handling means, comprising: an upstanding cone-shaped body, said body being mounted on the operating side of each of said dies; and an auger, being a band projecting from the exterior walls of said cone-shaped body, and projecting in a spiral pattern from the apex to the base of said cone-shaped body.

2. The apparatus of claim 1 wherein material compressed by said dies is discharged through holes in said table.

3. The apparatus of claim 1 wherein three of said dies are mounted on said table and meshed in series.

4. The apparatus of claim 1 wherein four of said dies are mounted on said table and meshed in series.

* * * * *